United States Patent [19]
Kitchen, Jr. et al.

[11] 3,785,601
[45] Jan. 15, 1974

[54] SHOCK ABSORBING SECUREMENT DEVICE

[75] Inventors: Elwyn L. Kitchen, Jr., Troy; Gregory H. Kirk, Farmington, both of Mich.

[73] Assignee: General Motors Corporation, Detroit, Mich.

[22] Filed: Apr. 3, 1972

[21] Appl. No.: 240,356

[52] U.S. Cl. ...... 248/119 R, 105/366 B, 105/368 R, 248/361 R
[51] Int. Cl. ....... B60p 3/06, B60p 7/08, B60d 45/00
[58] Field of Search ..................... 248/9, 10, 22, 24, 248/358 R, 361 R; 105/368 R, 366 D, 366 B

[56] References Cited
UNITED STATES PATENTS
| | | | |
|---|---|---|---|
| 3,603,267 | 9/1971 | Schwiebert | 248/119 R |
| 3,354,838 | 11/1967 | Mowatt-Larssen | 248/119 R X |
| 2,138,175 | 11/1938 | Keys | 248/22 |
| 3,667,401 | 6/1972 | Schwiebert | 105/366 D |
| 2,988,018 | 6/1961 | Stough | 248/199 R UX |
| 3,659,533 | 5/1972 | Venditly | 105/368 R |
| 3,661,098 | 5/1972 | Jaekle | 105/368 R |

FOREIGN PATENTS OR APPLICATIONS
| | | | |
|---|---|---|---|
| 601,861 | 2/1960 | Italy | 248/9 |

*Primary Examiner*—J. Franklin Foss
*Attorney*—J. L. Carpenter et al.

[57] ABSTRACT

A securement device for maintaining a vehicle on a transporter characterized in that the securement device is formed in two parts which are bonded together by an elastomeric material. One part of the securement device is adapted to be mounted to the underside of the vehicle, while the other part is adapted to be connected to the transporter and the elastomeric material serves to absorb shock loads caused by movement of the vehicle due to inertial forces.

2 Claims, 5 Drawing Figures

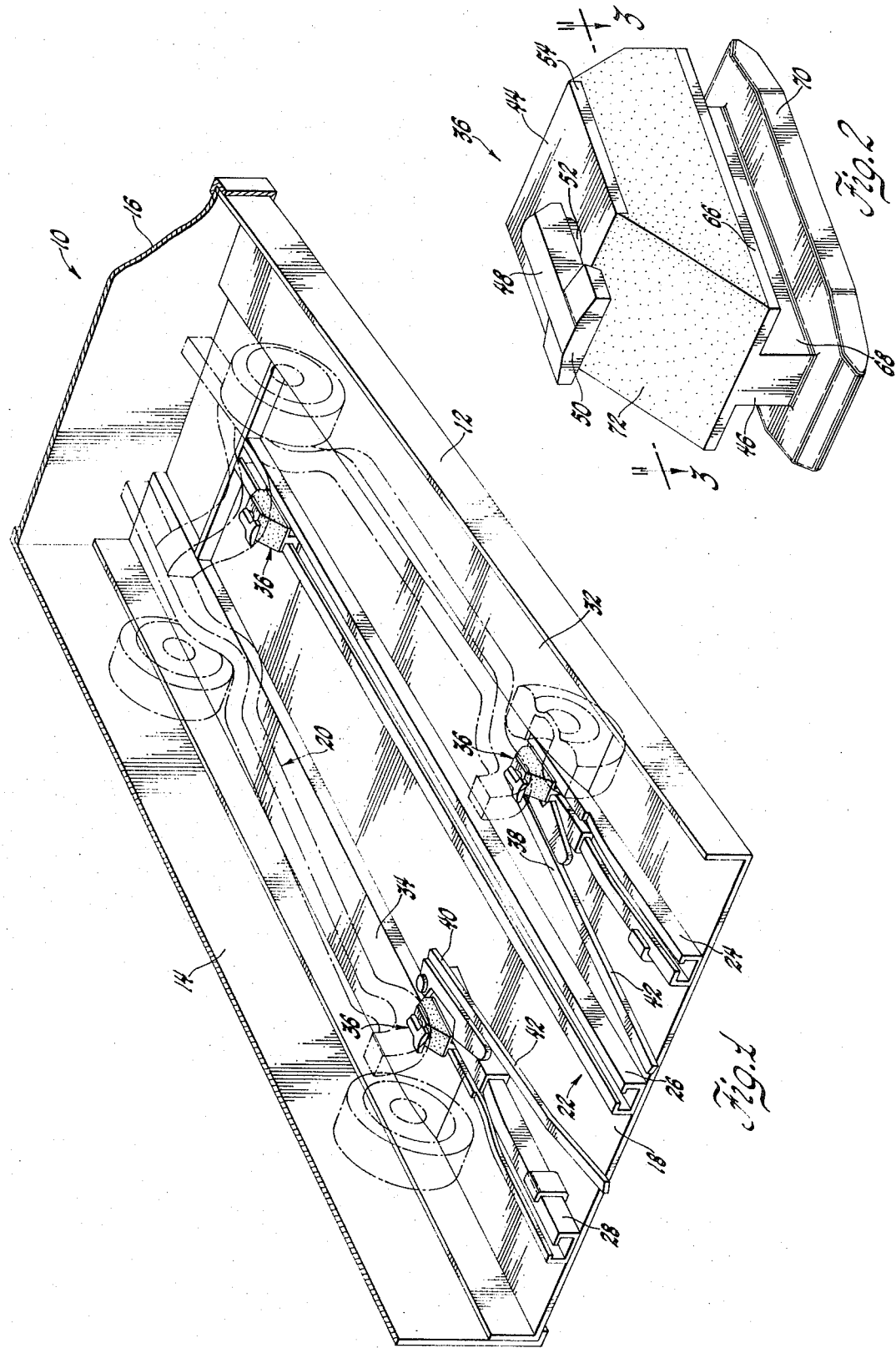

SHOCK ABSORBING SECUREMENT DEVICE

The present invention concerns a tie-down or securement device which is adapted to be used for connecting a vehicle to a restraint system of the type shown and described in copending patent application Ser. No. 187,625, entitled "Vehicle Positioning and Restraint Apparatus", filed Oct. 8, 1971, in the name of Cwycyshyn et al, and assigned to the assignee of this invention. The arrangement disclosed in the latter-mentioned application includes three parallel guide rails which cooperate with and slidably receive three tie-down devices attached to the underside of the vehicle. The outer guide rails incorporate latching mechanisms which are manually operated and serve to trap the associated tie-down devices to prevent it, and accordingly the vehicle, from moving in a fore-and-aft, vertical, or a longitudinal direction relative to the transporter. The restraint system is incorporated in a portable shipping container that can be loaded onto a carrier such as a railway car.

Automotive vehicles shipped in containers of the abovedescribed type or in other forms of carriers are frequently subjected to relatively high inertial forces during movement of the carrier. This is particularly true in the case of railway car transporters which are started in motion by a jerking action on the part of the locomotive and at times travel along irregular road beds as well as misaligned rails. Under such conditions, the railway car experiences erratic sidewise and other movement with resultant high load concentration on the securement devices holding the vehicle in place.

Accordingly, there is a need to provide some form of shock absorbing capability into the vehicle restraint arrangement so as to prevent damage from occurring to the vehicle during shipment. To this end, the present invention contemplates a securement device which serves to connect the vehicle to the transporter and incorporates yieldable means for absorbing shock loads which might cause excessive stress concentations on the vehicle frame. In the preferred form, this is accomplished by having the securement device formed in two parts which are bonded together through an elastomeric material such as rubber. One part of the securement device includes a head which is adapted to be located in an aperture formed in the underbody of the vehicle. The other part of the securement device includes means which are slidably received by the guide rail mounted on the transporter. In this fashion, the vehicle is connected to the transporter and held thereon by the securement device. At the same time, the elastomeric material serves as a cushion to absorb any shock loads created by inertial forces acting on the vehicle during the transit thereof.

The objects of the present invention are to provide a securement device that maintains a vehicle in position on a transporter and incorporates resilient means for absorbing shock loads created by inertial movement of the vehicle; to provide a two-part securement device in which the parts are joined together by a yieldable material and prevented from separating by a mechanical connection which permits relative movement of the parts between fixed limits; to provide a tie-down device which holds a vehicle on a transporter and has shock absorbing capabilities so as to prevent damage to the vehicle during transit thereof; to provide a detachable tie-down device for securing a vehicle to a guide rail and enabling the vehicle to move along three mutually perpendicular axes relative to the guide rail between set limits while being cushioned during such movement.

Other objects and advantages of the present invention will be apparent from the following detailed description when taken with the drawings in which:

FIG. 1 is a perspective view showing the positioning and restraint apparatus for a vehicle incorporating securement devices made according to the invention;

FIG. 2 is an enlarged perspective view of one of the securement devices employed with the apparatus of FIG. 1;

Figure 3:
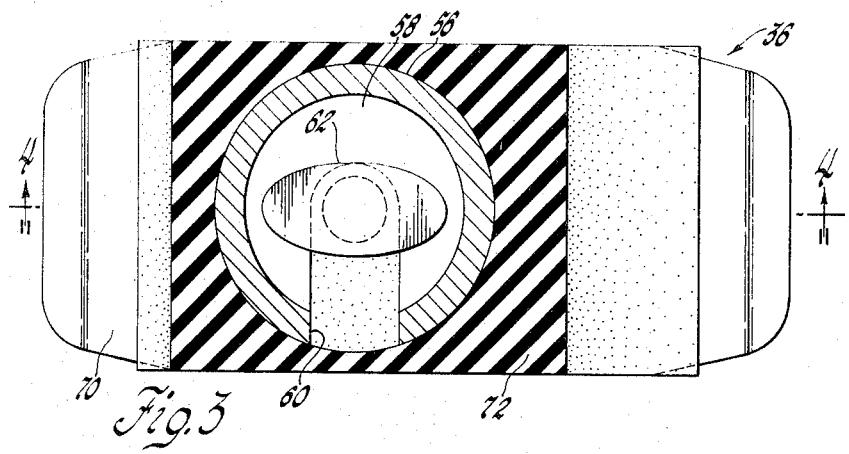
FIG. 3 is an enlarged sectional view taken on line 3—3 of FIG. 2.

Referring to the drawings and more particularly FIG. 1 thereof, a shipping container 10 is shown comprising side walls 12 and 14, an end wall 16, and a floor portion 18. This shipping container is similar to that illustrated in the aforementioned patent application and is intended to have multiple decks or floor portions, each of which is adapted to accommodate a vehicle, the frame 20 of which is shown in phantom lines. A positioning and restraint apparatus 22 is incorporated with each floor portion 18 of the shipping container 10 for holding the vehicle in place when the shipping container 10 is in transit on a carrier or transporter such as a railway car.

In this regard, it will be noted that the positioning and restraint apparatus 22 comprises three elongated guide rails 24, 26, and 28 which are located along parallel axes with equal spacing between adjacent guide rails. Each guide rail is a channel member which in cross section is C-shaped and is fixedly secured to the floor portion 18 which includes raised parallel tracks 32 and 34 located outboard of the guide rails 24 and 28, respectively. As should be apparent, the tracks 32 and 34 serve to accommodate the tires of the vehicle as the latter moves into the shipping container 10.

Each of the guide rails 24, 26, and 28 is adapted to receive a securement or tie-down device 36 made according to the invention and shown in FIG. 2. In this regard and as seen in FIG. 1, three identical tie-down devices 36 are secured to the vehicle frame 20 so as the vehicle is rolled into the open end of the shipping container 10, the tires are accommodated by the tracks 32 and 34 and each of the tie-down devices 36 slides within one of the guide rails and serves to position the vehicle so as to prevent lateral and vertical movement thereof. A pair of identical latch mechanisms 38 and 40 are operatively associated with the outer guide rails 24 and 28, respectively, and each mechanism includes a pivoted lock lever 42 which, when moved toward the associated guide rail, serves to trap a tie-down device 36 to prevent fore-and-aft movement of the vehicle. Thus, the tie-down devices 36 cooperate with the guide rails 24, 26, and 28 to hold the vehicle from longitudinal, vertical and sidewise movement.

Figure 4:
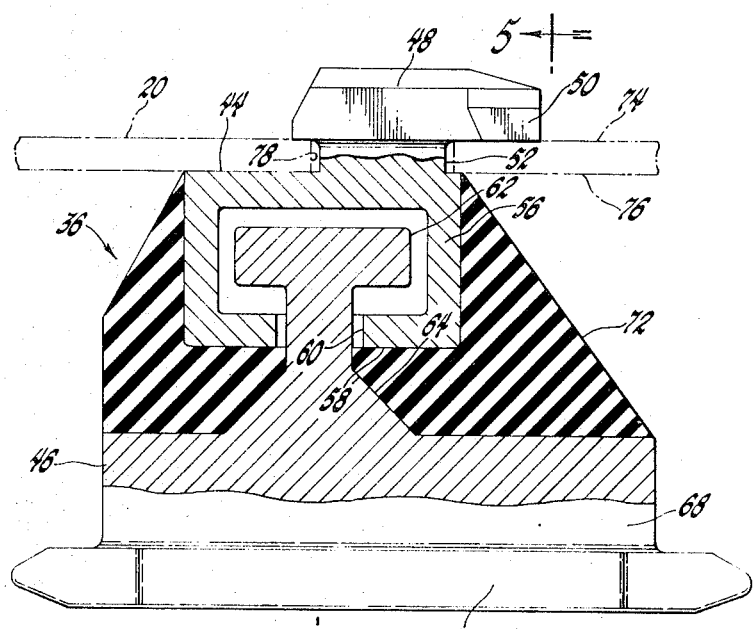
FIG. 4 is a sectional view taken on line 4—4 of FIG. 3.
Figure 5:
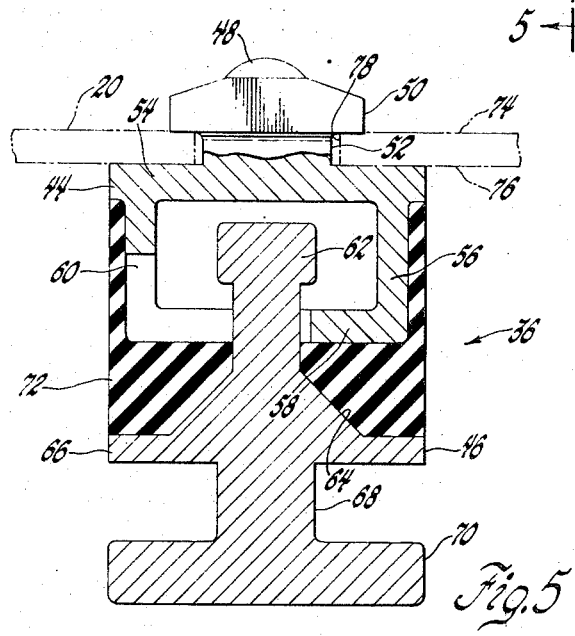
FIG. 5 is a sectional view taken on line 5—5 of FIG. 4.

As seen in FIGS. 4 and 5, each tie-down device 36 is formed in two parts consisting of a top portion 44 and a bottom portion 46. The top portion 44 comprises a head having an axially extending section 48 which is integrally formed with a cross bar 50. The head is fixed with a neck portion 52 that is integral with a rectangular bearing plate 54 located in a horizontal plane. As seen in FIGS. 3 and 5, a generally cylindrical section 56 extends downwardly from the bearing plate 54 and is partially closed at the lower end by a bottom wall 58. A vertically orientated L-shaped slot 60 is machined into the bottom wall 58 as well as the cylindrical section 56 and serves as a passage for receiving a T-shaped key portion 62 which is integrally formed with the bottom portion 46 and located along an axis transverse to the axis of the slot 60. As seen in FIG. 5, the key portion 62 is fixed with a conical section 64 which in turn is secured and integrally formed with a base member 66. An elongated connecting bar 68 depends from the base member 66 and terminates at the lower end thereof with a foot 70 which is adapted to be received within the guide rail.

As mentioned above, the key portion 62 is housed within the cylindrical section 56 of the top portion 44, and as should be apparent, serves as a mechanical connection between the top and bottom portions of the securement device 36. As seen in FIGS. 3, 4 and 5, it will be noted that sufficient clearance is provided between the key portion 62 and the inner surfaces of the cylindrical section 56 and the bottom wall 58 so as to allow relative movement between the top and bottom portions without permitting separation thereof. It will also be noted that the top portion 44 is bonded to the bottom portion 46 through a block 72 of elastomeric material which fully encloses the cylindrical section 56 and extends laterally to a point in vertical alignment with the side edges of the base member 66 as seen in FIGS. 2 and 5. In the preferred form, rubber can be used for providing the resilient bond between the top portion 44 and the bottom portion 46 of the securement device. However, it will be understood that other elastomeric materials such as polyurethane can serve the same function. The elastomeric material serves as a shock absorber in a manner to be described below.

As seen in FIGS. 4 and 5, the securement device 36 is shown attached to the vehicle frame 20 which in this instance is shown to be a plate section having upper and lower contact surfaces 74 and 76, respectively. The head is located adjacent the upper contact surface 74, while the main body portion of the securement device 36 is located below and adjacent the lower contact surface 76. The plate section is provided with an oblong aperture 78 which accommodates the neck portion 52 of the securement device 36. In mounting the securement device 36 to the frame 20, the cross bar 50 is first inserted into the aperture 78 with the securement device 36 positioned so that the longitudinal axis of the section 48 is orientated in a generally vertical position. After the cross bar enters the aperture 78, the body portion is rotated 90° horizontally and then raised upwardly so as to cause the section 48 to pass through the aperture in the frame 20. The securement device 36 is then rotated 90° in an opposite direction in a horizontal plane so as to lock the securement device 36 to the frame 20. After all three of the securement devices 36 have been attached to the vehicle frame 20 in the above-described manner, the vehicle is then loaded into the container 10 as hereinbefore described. With the securement devices 36 positioned as shown in FIG. 1, the lock levers 42 of the latch mechanisms 38 and 40 are moved toward the associated guide rail so as to capture the securement devices. The vehicle is then secured to the shipping container 10 and the latter can be loaded on a railway car or other form of transporter for shipping purposes. As should be apparent, during shipping any inertial movement of the vehicle will be cushioned by the elastomeric material associated with each of the securement devices 36. Thus, the elastomeric material acts as a shock absorbing medium which serves to reduce the loading on the vehicle frame.

Various changes and modifications can be made in this construction without departing from the spirit of the invention. Such changes and modifications are contemplated by the inventors and they do not wish to be limited except by the scope of the appended claims.

We claim:

1. A securement device for maintaining a vehicle in a secured position on a transporter and having a head adapted to be located in an aperture formed in the underbody of the vehicle for attaching the securement device to the vehicle, said securement device including a top portion formed with said head and a separate bottom portion adapted to move relative to the top portion along three mutually perpendicular axes and cooperate with means rigidly mounted on the transporter for holding the vehicle on said transporter, said underbody including a plate section having a pair of contact surfaces formed on the opposite sides thereof so when the securement device is attached to said underbody the head is located adjacent one contact surface and the top portion is located adjacent the other contact surface, elastomeric means bonding the top portion to the bottom portion and serving to absorb shock loads when the securement device maintains the vehicle in a secured position, and stop means enclosed by said elastomeric means and formed with said top portion and said bottom portion so as to positively limit relative movement between said top and bottom portions.

2. A securement device for maintaining a vehicle in a secured position on a transporter and having a head adapted to be located in an aperture formed in the underbody of the vehicle for attaching the securement device to the vehicle, a top portion formed with said head and having a slot formed therein, a separate bottom portion having a foot adapted to cooperate with a rail rigidly mounted on the transporter for holding the vehicle on said transporter, a T-shaped member formed with said bottom portion and adapted to cooperate with said slot for limiting relative movement between said top portion and said bottom portion along three mutually perpendicular axes, said underbody including a plate section having a pair of contact surfaces formed on the opposite sides thereof so when the securement device is attached to said underbody the head is located adjacent one contact surface and the top portion is located adjacent the other contact surface, and elastomeric means enclosing the mechanical connection provided by the T-shaped member and the slot and bonding the top portion to the bottom portion so as to absorb shock loads while the securement device maintains the vehicle in a secured position.

* * * * *